(12) United States Patent
Erike

(10) Patent No.: US 6,386,583 B1
(45) Date of Patent: May 14, 2002

(54) LOW-CARBON HIGH-STRENGTH STEEL

(75) Inventor: Eric C. Erike, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/654,153

(22) Filed: Sep. 1, 2000

(51) Int. Cl.⁷ .......................... B60R 21/26; C22C 38/44
(52) U.S. Cl. .................. 280/737; 280/741; 148/335; 420/109
(58) Field of Search ................ 280/737, 741; 148/334, 335; 420/104, 105, 108, 109, 111, 112

(56) References Cited

U.S. PATENT DOCUMENTS

| | | |
|---|---|---|
| 3,645,725 A | 2/1972 | Denhard, Jr. et al. |
| 4,765,953 A | 8/1988 | Hagenfeldt et al. |
| 4,892,704 A | 1/1990 | Sawaragi |
| 5,348,344 A | 9/1994 | Blumenthal et al. |
| 5,388,322 A * | 2/1995 | Simon |
| 6,056,833 A * | 5/2000 | Asfahani et al. |
| 6,159,312 A * | 12/2000 | Koo et al. |
| 6,187,117 B1 * | 2/2001 | Shen et al. |

* cited by examiner

*Primary Examiner*—Paul N. Dickson
(74) *Attorney, Agent, or Firm*—Tarolli, Sundheim, Covell, Tummino & Szabo L.L.P.

(57) ABSTRACT

A low carbon high strength steel consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

9 Claims, 1 Drawing Sheet

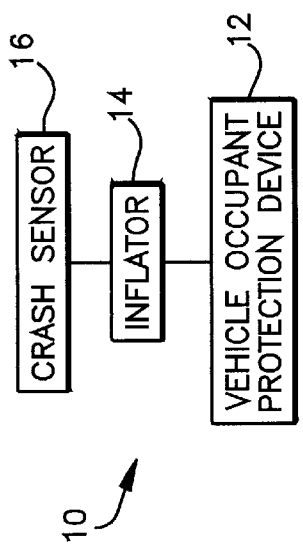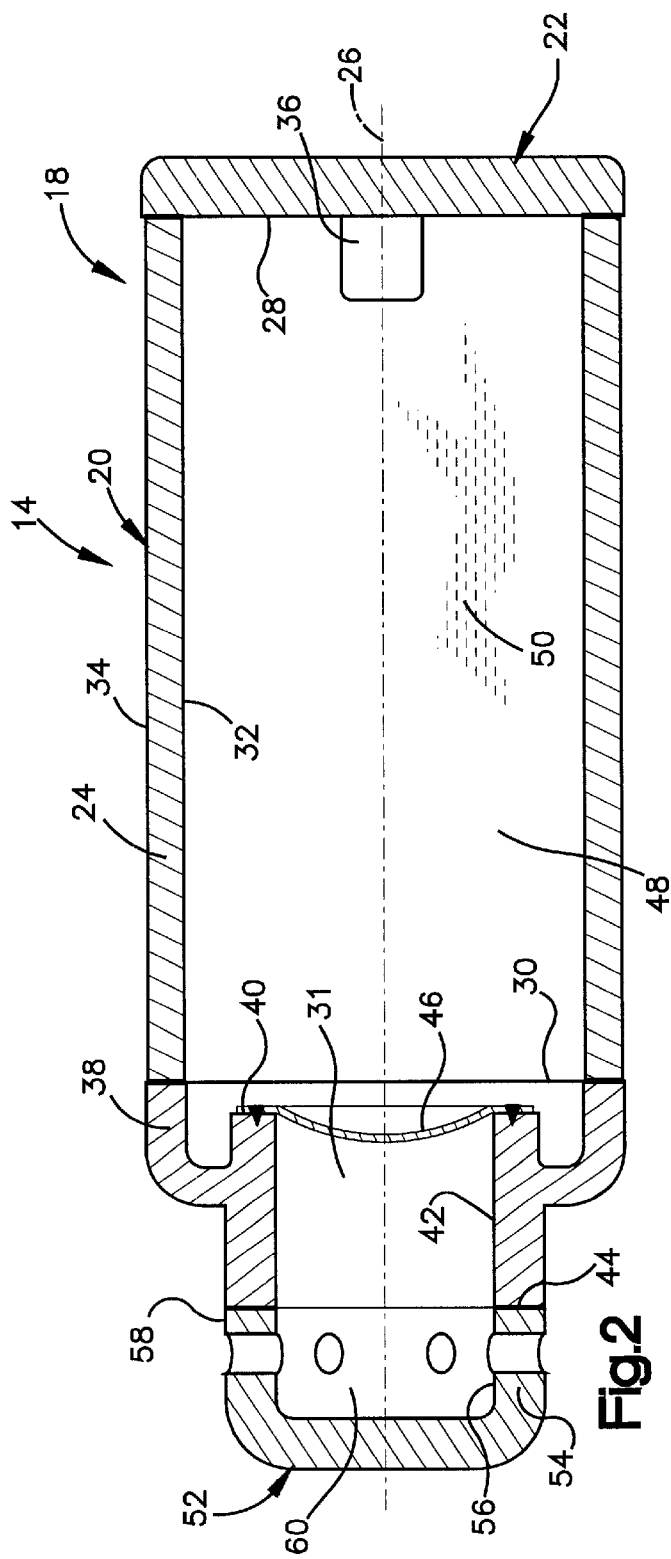

LOW-CARBON HIGH-STRENGTH STEEL

FIELD OF THE INVENTION

The present invention relates to a steel composition and particularly relates to a steel composition for a housing of an inflator for inflating an inflatable vehicle occupant protection device.

BACKGROUND OF THE INVENTION

An inflator for inflating an inflatable vehicle occupant protection device includes a quantity of a stored gas and a body of combustible material stored in an inflator housing. An igniter is actuatable to ignite the body of combustible material. As the body of combustible material burns, the combustion products heat the stored gas. The heated stored gas and the combustion products form an inflation fluid for inflating the vehicle occupant protection device. Another inflator includes a stored inert gas and a stored combustible gas, such as hydrogen. An igniter ignites the combustible gas, which heats the stored inert gas.

SUMMARY OF THE INVENTION

The present invention is a low carbon high strength steel consisting essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

Preferably, the present invention is an inflator for inflating a vehicle occupant protection device. The inflator comprises a housing and a supply of gas stored in the housing. At least a portion of the housing consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection apparatus embodying the present invention; and FIG. 2 is a sectional view of part of the apparatus of FIG. 1.

DESCRIPTION OF PREFERRED EMBODIMENT

Referring to FIG. 1, a vehicle occupant protection apparatus 10 includes an inflatable vehicle occupant protection device 12. In the preferred embodiment of the present invention, the inflatable vehicle occupant protection device 12 is an air bag. The inflatable vehicle occupant protection device 12 could be for example an inflatable seat belt, an inflatable knee bolster, an inflatable head liner, an inflatable side curtain, or a knee bolster operated by an air bag.

An inflator 14 is associated with the vehicle occupant protection device 12. The inflator 14 is actuatable to direct inflation fluid to the inflatable vehicle occupant protection device 12 to inflate the inflatable vehicle occupant protection device 12.

The system also includes a crash sensor 16. The crash sensor 16 is a known device that senses a vehicle condition, such as vehicle deceleration, indicative of a collision. The crash sensor 16 measures the magnitude and the duration of the deceleration. If the magnitude and duration of the deceleration meet predetermined threshold levels, the crash sensor either transmits a signal or causes a signal to be transmitted to actuate the inflator 14. The inflatable vehicle occupant protection device 12 is then inflated and extends into the occupant compartment of the vehicle to help protect a vehicle occupant from a forceful impact with parts of the vehicle.

While the inflator 14 could be a pyrotechnic inflator (not shown), in the preferred embodiment of the invention, the inflator 14 is a heated gas inflator as disclosed in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc.

As shown in FIG. 2, the inflator 14 includes a housing 18. The housing 18 includes a container 20. The container 20 includes a generally cylindrical tubular side wall 24 extending along a central axis 26 between a first open end 28 of the tubular side wall 24 and a second open end 30 of the tubular side wall 24. The tubular side wall 24 includes a cylindrical inner surface 32 and a cylindrical outer surface 34.

The housing 18 further includes an end cap 22 secured to the first open end 28 of the tubular side wall 24 by a weld. The end cap 22 supports an actuatable pyrotechnic igniter 36. The igniter 36 includes suitable ignitable material (not shown).

The housing 18 also includes an end wall 38 secured to the second open end 30 of the tubular side wall 24 by any suitable means, such as a weld. The end wall 38 includes a radially extending first surface 40 and an axially extending cylindrical surface 42. The surfaces 40 and 42 are centered on the axis 26. The cylindrical surface 42 of the end wall 38 has a diameter smaller than the diameter of the inner surface 32 of the tubular side wall 24 and extends axially between and connects the first surface 40 of the end wall 38 and a radially extending second surface 44 of the end wall 38. The cylindrical surface 42 defines a passage 31 through the end wall 38.

A burst disk 46 is secured to the first surface 40 of the end wall 38 by any suitable means, such as a weld. The burst disk 46 closes the passage 31. Together the burst disk 46 and the end wall 38 close the second open end 30 of the tubular side wall 24 to define a closed chamber 48 in the container 20. The chamber 48 is defined by the end wall 38, the burst disk 46, the cylindrical tubular side wall 24, and the end cap 22.

A supply of gas 50 for inflating the inflatable vehicle occupant protection device 12 is stored in the chamber 48. The supply of gas 50 comprises at least one inert gas. The preferred inert gas is nitrogen, argon, or a mixture of nitrogen and argon.

The supply of gas 50 also includes an oxidizer gas and a combustible fuel gas. A preferred oxidizer gas is oxygen. Preferred fuel gases include hydrogen, nitrous oxide, and/or methane. Alternatively, the stored gas 50 may comprise a mixture of air and hydrogen.

Preferably, the stored gas 50 includes at least a small amount of a tracer gas, such as helium, for helping to detect gas leaks, as is known.

The stored gas 50 within the container 48 is under pressure. The pressure depends upon such factors as the volume of the inflatable vehicle occupant protection device 12 to be inflated, the time available for inflation, the inflation pressure desired, and the volume of the chamber 48 storing the gas. The stored gas 50 in the chamber 48 is typically at a pressure of about 2,000 to about 8,000 pounds per square inch (psi). Preferably, the stored gas 50 in the chamber 48 is at a pressure of about 3,500 psi to about 6,500 psi.

A diffuser 52 is connected to the second surface 44 of the end wall 38 by any suitable means, such as a weld. The diffuser 52 includes a cylindrical side wall 54 coaxial with the tubular side wall 24 of the container 20 and centered on the axis 26. The side wall 54 includes a cylindrical inner surface 56 and cylindrical outer surface 58. The diffuser 52 has a central chamber 60. The chamber 60 is in fluid communication with the passage 31 in the end wall 38.

In accordance with a preferred embodiment of the present invention, the tubular side wall 24 of the housing 18 is made from a low-carbon high-strength steel. The low-carbon high-strength steel consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron. By residual elements, it is meant the combined weight of additional elements including, for example, titanium, lead, niobium, cobalt, aluminum, calcium, and/or tin.

The composition of the low-carbon high-strength steel is critical. Omission of one of the elements or departure of any of these critical elements from the ranges set forth above will make the low-carbon high-strength steel unsuitable for use as the material of which the housing 18 of the inflator 14 is made.

Carbon increases the strength of the steel, but decreases the ductility of the steel and the resistance of the steel to hydrogen embrittlement and stress corrosion cracking. When the carbon content of the steel is less than about 0.07% by weight, the steel does not have sufficient strength to be used in the housing 18 of the inflator 14. When the carbon content is greater than about 0.12% by weight, the steel is susceptible to hydrogen embrittlement and stress corrosion cracking.

Manganese increases the strength and toughness of the steel, but decreases the ductility and resistance of the steel to hydrogen embrittlement and stress corrosion cracking. The manganese content is determined in relation to the carbon content. When the manganese content of the steel is less than about 0.70% by weight, the steel does not have sufficient strength and toughness to be used in the housing 18 of the inflator 14. When the manganese content is greater than about 1.60% by weight, the steel is susceptible to hydrogen embrittlement and stress corrosion cracking.

Phosphorous decreases the creep and rupture strength of steel and resistance of the steel to hydrogen embrittlement. When the phosphorous content is greater than 0.020% by weight, the steel is susceptible to hydrogen embrittlement.

Sulfur, like phosphorous, decreases the creep and rupture strength of steel and resistance of the steel to hydrogen embrittlement. When the sulfur content is greater than 0.015% by weight, the steel is susceptible to hydrogen embrittlement.

Silicon increases the strength of the steel and the oxidation resistance of the steel. Silicon also decreases the workability (i.e., increases the work hardening rate) of the steel. When the silicon content of the steel is less than about 0.06% by weight, the steel is susceptible to oxidation during formation and welding of the steel. Oxidation of the steel degrades the strength and toughness of the steel. When the silicon content of the steel is greater than about 0.35% by weight, the workability of the steel degrades.

Chromium increases the corrosion resistance and oxidation resistance of the steel, but decreases the workability (i.e., increases the work hardening rate) of the steel. When the chromium content of the steel is less than about 0.25% by weight, the steel is susceptible to corrosion and oxidation. When the chromium content of the steel is greater than about 1.20% by weight, the workability of the steel degrades.

Nickel increases the ductility of the steel and corrosion resistance of the steel, but decreases the workability (i.e., increases the work hardening rate) of the steel. When the nickel content of the steel is greater than about 0.65% by weight, the workability of the steel degrades.

Molybdenum increases the corrosion resistance and oxidation resistance of the steel, but decreases the workability (i.e., increases the work hardening rate) of the steel. The molybdenum content is determined in relation with the chromium content. When the molybdenum content of the steel is less than about 0.20% by weight, the steel is susceptible to corrosion and oxidation. When the molybdenum content is greater than about 0.70% by weight, the workability of the steel degrades.

Copper increases the corrosion resistance of steel, but decreases the resistance of the steel to stress corrosion cracking. When the copper content of the steel is greater than about 0.35% by weight, the resistance of the steel to stress corrosion cracking is decreased.

Aluminum improves the corrosion resistance, the workability, and ductility of the steel. When the aluminum content of the steel is at least about 0.02% by weight, the corrosion resistance, workability, and ductility of the steel increase. When the aluminum content of the steel is greater than about 0.06% by weight, the workability of the steel degrades.

Vanadium increases the corrosion resistance and abrasion resistance of the steel. When the vanadium content is greater than about 0.05%, the workability of the steel degrades.

The tubular side wall 24 is manufactured from a cylindrical billet of low-carbon high-strength steel. The cylindrical billet of low-carbon high-strength steel has a uniform diameter along the entire axis of the billet.

The cylindrical billet of steel is formed into a seamless tube with a cylindrical wall by passing the cylindrical billet through a known piercing mill. In the present invention, the cylindrical billet is heated to a temperature of about 1000° C. to about 1500° C. and, while at a temperature of about 1000° C. to about 1500° C., the cylindrical billet is passed through the piercing mill.

The seamless tube so formed has a cylindrical wall with a thickness uniform along the axis of the tube and circumferentially around the tube. The outer diameter of the cylindrical wall is substantially less than the diameter of the cylindrical billet. The length of the seamless tube is substantially longer than the length of the cylindrical billet.

The seamless tube is cooled to room temperature, (i.e., about 22° C.). Once the tube is at room temperature, the tube may be pickled in an acid solution to remove any scale or oxides formed on the inner or outer surface of the cylindrical wall during piercing. Suitable pickling solutions may include sulfuric acid, phosphoric acid, nitric acid, hydrochloric acid, and combinations thereof.

The cylindrical wall of the tube is then reduced in thickness by cold drawing the tube. Cold drawing involves pulling the tube at room temperature through a die, the hole of which is smaller than the outside diameter of the tube being drawn. At the same time, the inside surface of the tube is supported by a mandrel anchored on the end of a rod so that the tube remains in the plane of the die during the drawing operation.

The tube is passed through the die at least once to reduce in thickness the cylindrical wall of the tube. The cylindrical wall of the tube may be reduced in thickness by multiple passes of the tube through the die with each pass slightly reducing the thickness of the cylindrical wall.

The tube in the present invention may be lubricated with an oil based or water based emulsion prior to cold drawing in order to reduce the heat generated by friction as the tube passes through the die.

The thickness of the cylindrical wall after cold drawing is uniform along the axis of the tube and circumferentially around the tube. The thickness of the cylindrical wall is substantially less than the thickness of the cylindrical wall prior to cold drawing.

The tube is polished to remove objectionable pits and surface blemishes and then annealed. Preferably, the tube is annealed at a temperature of about 200° C. to about 600° C. for at least about forty-five minutes in an air atmosphere.

The tube is cut to length and welded to an endcap, such as 22, of low-carbon steel and an endwall, such as 38, of low-carbon steel. The endwall is also welded to a diffuser, such as 52, of low-carbon steel. The low-carbon steel employed in the endcap, the endwall, and diffuser preferably consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron The tube cut to length, endcap, endwall, and diffuser are welded together by any suitable means, such as friction welding, autogenous gas tungsten arc welding, electron beam welding, or laser welding. Preferably, the tube, endcap, endwall, and diffuser are welded together by laser welding.

EXAMPLE

An inflator housing, like housing 18, was prepared from a cylindrical billet of low-carbon high strength steel. The cylindrical billet had a length of about 3 meters and a diameter of about 20.32 centimeters. The composition of the cylindrical billet of low-carbon high strength steel was selectively controlled such that the low-carbon high strength steel consisted essentially consisting essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron The cylindrical billet was heated to a temperature of about 1200° C. and, while at 1200° C., passed through a piercing mill to form a seamless tube with a uniform wall thickness along the entire axis of the tube and circumferentially entirely around the tube.

After piercing, the tube was allowed to cool until it reached room temperature. Once at room temperature, the thickness of the cylindrical wall was reduced by cold drawing of the tube. The thickness of the cylindrical wall of tube after cold drawing was about 3 mm.

The tube was annealed at a temperature of about 520° C. for about 45 minutes, cooled to room temperature, and cut to the desired length to form a cylindrical wall, such as 24.

The tube so formed was tested in accordance with ASTM E8/E8M and DIN/EN 10002. The tube exhibited outstanding mechanical properties including a tensile strength of at least about 130,000 psi, a yield strength of at least about 104,000 psi, and elongation at break of at least about 14%.

The tube was also tested for susceptibility to hydrogen embrittlement and stress corrosion cracking.

The tube cut to the desired length was laser welded to an end cap, such as 22, of low-carbon high strength steel and an endwall, such as 38, of low-carbon high strength steel. The endwall was also welded to a diffuser, such as 52, of low-carbon high strength steel. The composition of the low-carbon steel employed in the endcap, endwall, and diffuser was selectively controlled such that the low-carbon steel consisted essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

A c-ring type specimen was removed from the welded portion of the housing and placed in a 3% NaCl saturated air atmosphere. The c-ring type specimen was maintained at 25° C. and subjected to 1.5V from a Ag/AgCl hydrogen cathode charging mechanism (NACE TM0177 Method C). Stress equivalent to 100% of the actual yield strength was applied to the c-ring sample for one month.

Analysis by thermal absorption spectrometry and scanning electron microscopy revealed no evidence of hydrogen embrittlement in the welded portion or base metal surrounding the welded portion of the c-ring type specimen after the one month period.

Additionally, a c-ring type specimen was removed from a welded portion of the housing and placed in a 3% NaCl saturated air atmosphere at 80° C. (NACE TM0177 Method C) Stress equivalent to 100% of the actual yield strength was applied to the c-ring sample for one month.

Analysis by thermal absorption spectrometry and scanning electron microscopy revealed no evidence of stress corrosion cracking in the welded portion or base metal surrounding the welded portion of the c-ring type specimen after the one month period.

Advantages of the present invention should now be apparent. Primarily, the present invention takes advantage of the improved mechanical properties of a low-carbon steel high strength steel, which consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron. A housing so formed from low-carbon high strength steel has a mechanical strength higher than that of conventional steel used in inflator housings. Moreover, the low-carbon high strength steel exhibits no hydrogen embrittlement in the welds or portions of the housing components adjacent to the welds.

From the above description of the invention, those skilled in the art will perceive improvements, changes and modifications. Such improvements, changes and modifications within the skill of the art are intended to be covered by the appended claims.

Having described the invention, the following is claimed:

1. A low carbon high strength steel consisting essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron, wherein said steel has a tensile strength of at least about 130,000 psi, a yield strength of at least about 104,000 psi, and elongation at break of at least about 14%.

2. A seamless tube comprising a low-carbon high-strength steel, said low-carbon high-strength steel consisting essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

3. The seamless tube of claim 2, wherein the seamless tube has a tensile strength of at least about 130,000 psi, a yield strength of at least about 104,000 psi, and elongation at break of at least about 14%.

4. An inflator for inflating a vehicle occupant protection device comprising a housing and a supply of gas stored in said housing, wherein at least a portion of said housing consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

5. The inflator of claim 4 wherein the housing comprises a seamless tube that consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

6. The inflator of claim 5, wherein the supply of gas includes hydrogen.

7. The inflator of claim 4, wherein said housing consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

8. A welded construction comprising a plurality of individual parts, a weld between said parts and joining them together, at least one of said welded parts comprising a low carbon high strength steel consisting essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron, said weld and a portion of said at least one of said welded parts adjacent said weld being resistant to hydrogen embrittlement and stress corrosion cracking.

9. The weld construction of claim 8 wherein said at least one of said welded parts has a tensile strength of at least about 130,000 psi, a yield strength of at least about 104,000 psi, and elongation at break of at least about 14%.

* * * * *